Oct. 23, 1934.           H. D. KNELLER           1,977,827
                   SELF WATERING FLOWER VESSEL
                   Filed Oct. 3, 1932        3 Sheets-Sheet 1
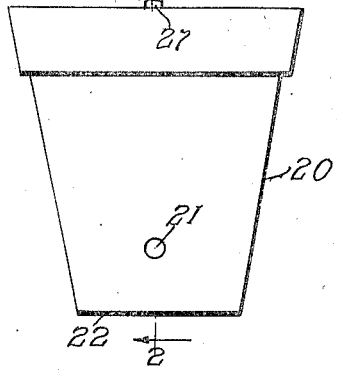
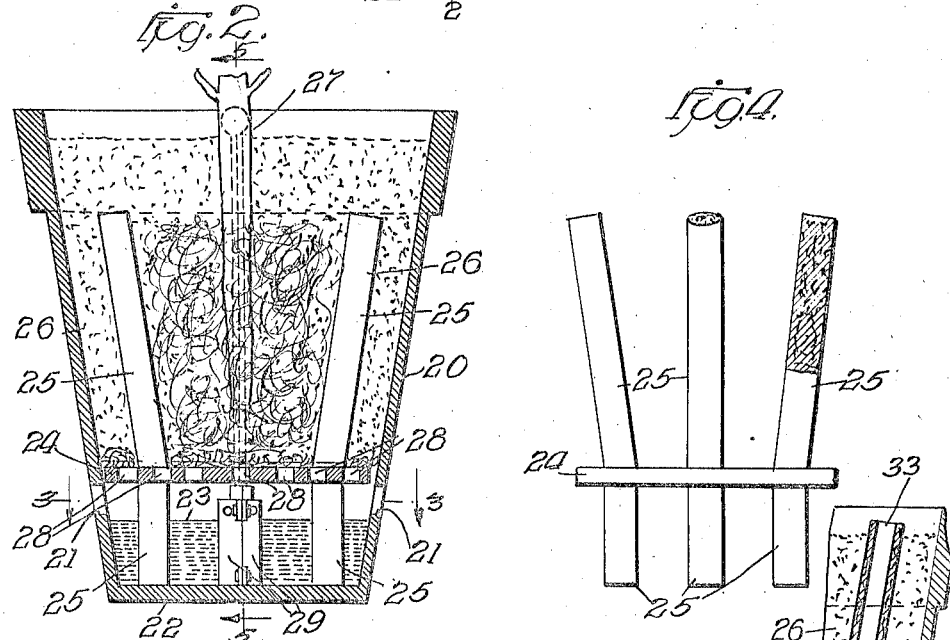
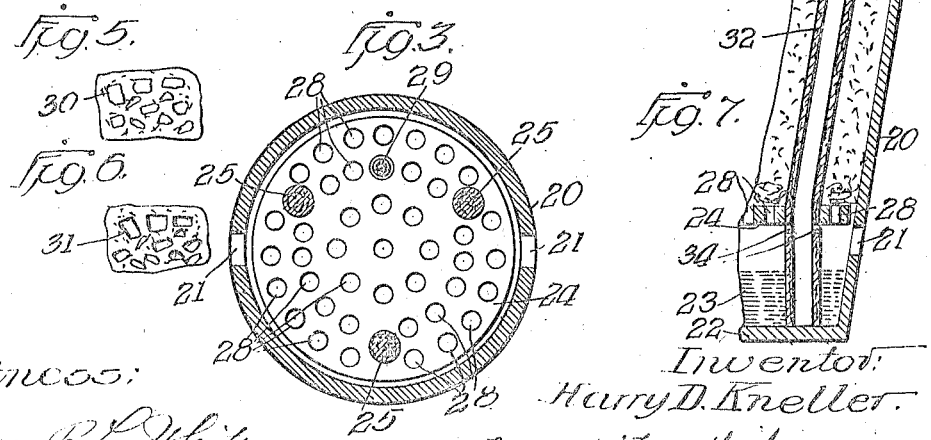
Witness:
Harry R. L. White
Inventor:
Harry D. Kneller.
By Edward Fay Wilson
                Atty

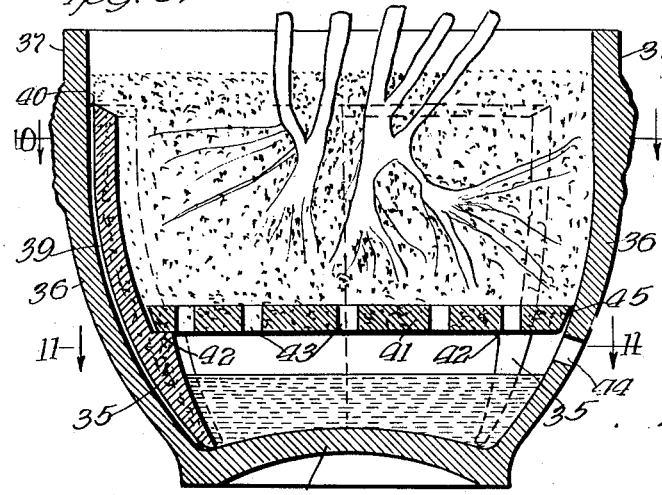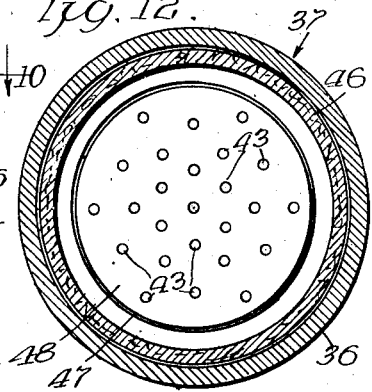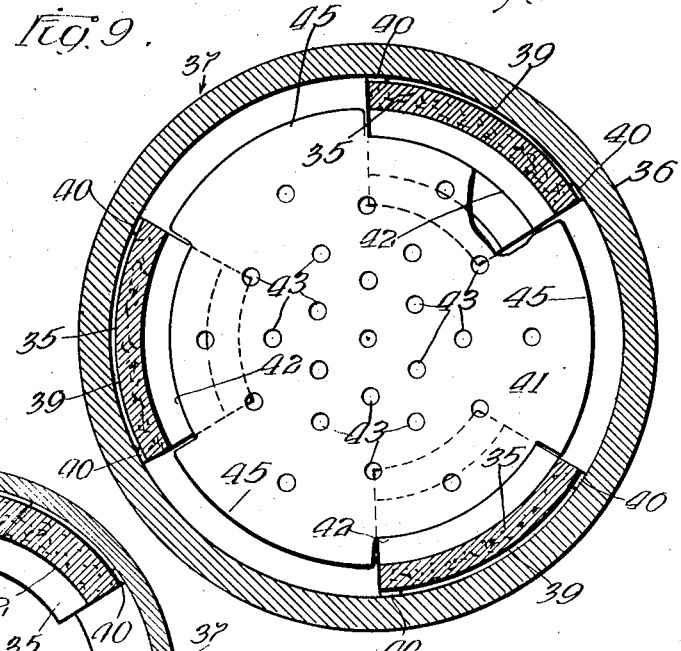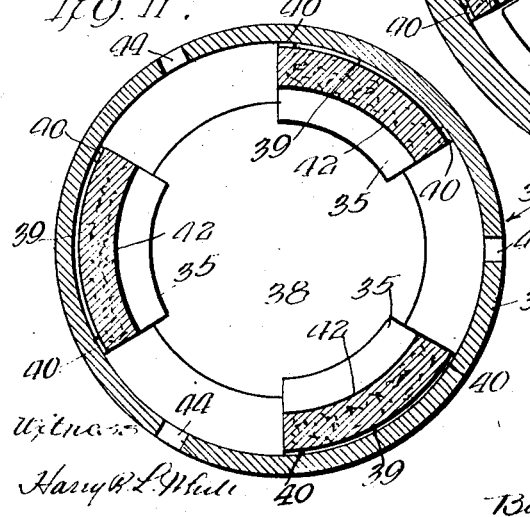

Oct. 23, 1934.   H. D. KNELLER   1,977,827
SELF WATERING FLOWER VESSEL
Filed Oct. 3, 1932   3 Sheets-Sheet 3
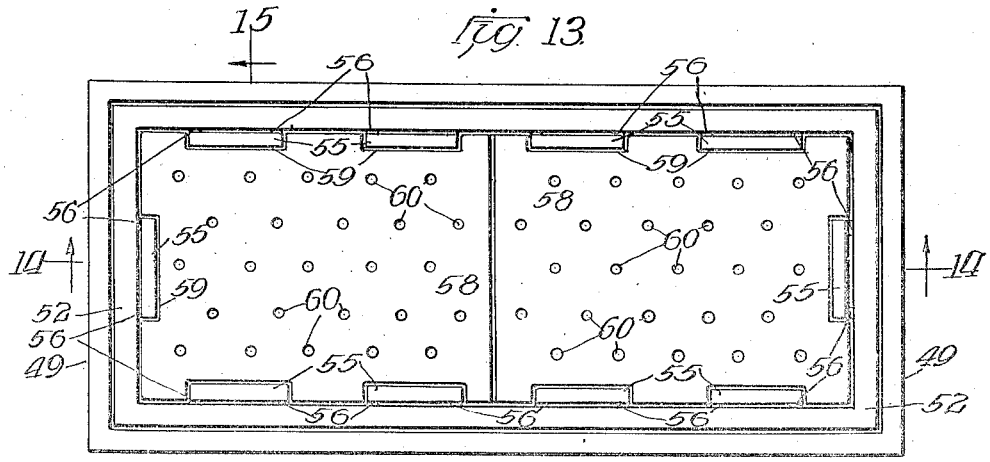
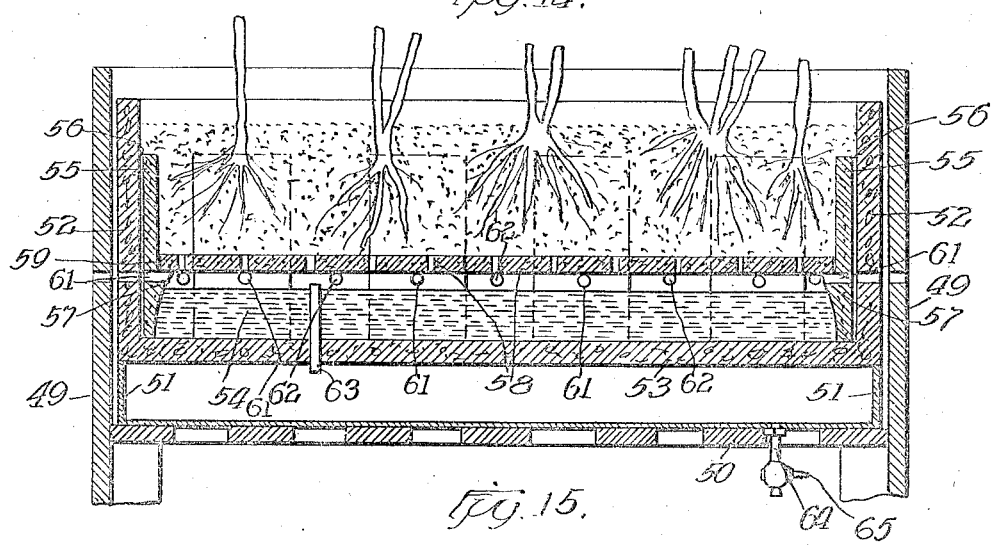
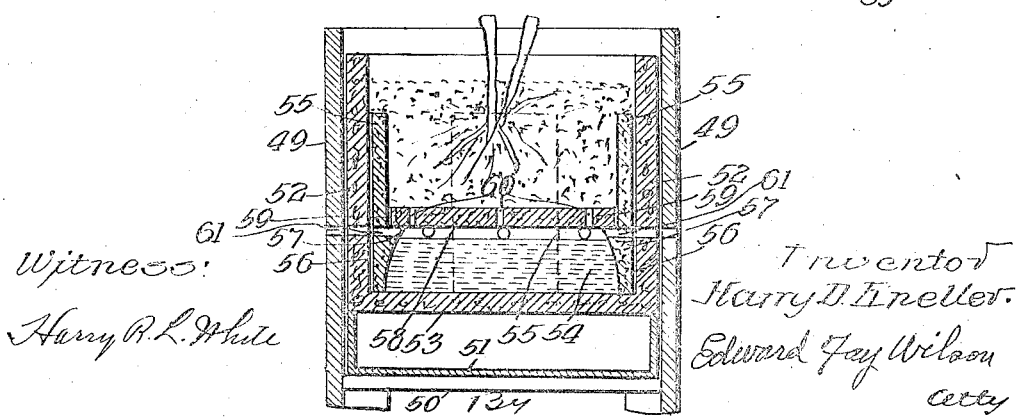

Patented Oct. 23, 1934

1,977,827

UNITED STATES PATENT OFFICE 1,977,827

SELFWATERING FLOWER VESSEL

Harry D. Kneller, Brookfield, Ill.

Application October 3, 1932, Serial No. 635,987

5 Claims. (Cl. 47—38)

Fig. 1 is a side elevation of a flower pot embodying the invention in one form;

Fig. 2 is a vertical, central section on the line 2—2 of Fig. 1;

Fig. 3 is a horizontal section on the line 3—3 of Fig. 2;

Fig. 4 is a detailed elevation, partly in section, of the porous members shown in Figs. 2 and 3;

Fig. 5 is a fragmentary sectional view of one of the porous members, illustrating one method of making same;

Fig. 6 is a view similar to Fig. 5 showing the porous member as completed;

Fig. 7 is a fragmentary sectional view similar to Fig. 2 but showing a combined porous water and air feeding member;

Fig. 8 is a view similar to Fig. 2 but showing a different form of porous water and air feeding members;

Fig. 9 is an inner face view of one of the porous members shown in Fig. 8;

Fig. 10 is a horizontal section on the line 10—10 of Fig. 8;

Fig. 11 is a horizontal section on the line 11—11 of Fig. 8;

Fig. 12 is a horizontal section of a modification, taken above the perforated floor;

Fig. 13 is a top plan view of a flower box embodying the invention in another form;

Fig. 14 is a vertical central section on the line 14—14 of Fig. 13; and

Fig. 15 is a vertical transverse section on the line 15—15 of Fig. 13;

In said drawings 20 represents a common earthen-ware flower pot which has been provided with holes 21 in the side walls and spaced above the bottom 22 of the pot. The lower part of the pot below the openings 21 is adapted to contain water as shown at 23.

Above the holes 21 is arranged a horizontal false bottom or floor 24. This floor 24 can be supported in any suitable manner but I prefer to support it on a plurality of vertically-arranged leg members 25 which extend down from the floor 24 and rest at their lower ends on the bottom of the flower pot.

The members 25 also extend up within the main part of the pot as best shown in Fig. 2, being inclined outwardly to some extent to correspond with the inclined wall of the pot. These legs 25 are made of porous baked clay and are adapted to carry the water from the lower part of the pot and deliver it into the earth 26 in the pot surrounding the members 25 for feeding water to the roots of a plant 27 growing in the pot. The floor 24 is also preferably made of porous material similarly to the leg members 25, and tends to keep equally moist over its whole area. The floor 25 is perforated, being provided with many small holes 28 so that if water is poured into the pot upon the earth it will seep down and drain through the holes 28 into the bottom of the pot from which it draws up, as needed, into the earth 26. A simple water-indicating device 29 is shown to indicate at a point above the earth, that the bottom of the pot is empty and that the water should be replenished.

The porous clay parts can be produced in a very simple manner by mixing about two parts of sawdust with one part of clay and molding the articles out of this mixture. When the articles are fired the sawdust is burned out and the articles are quite porous. This method is illustrated in Figs. 5 and 6. The sawdust is shown at 30 in Fig. 5 and the resultant holes 31 which make the article porous are shown in Fig. 6.

The openings 21 in the side of the pot serve two purposes, first and foremost they admit air to the pot below the floor 24 and the air can pass to the earth through the openings 28 in the floor. Second, they serve to limit the quantity of water in the bottom of the pot and prevent it from rising above the floor 24 when it would tend to rot the roots of the plant.

In Fig. 7 there is illustrated a slightly different form of the porous member for delivering the water to the plant. In this case the vertically-extending porous member shown at 32 is long enough so that its upper end 33 rises above the earth 26 and the member 32 is in the form of a tube. Also this member has a side opening 34 below the false floor 24. This construction permits air to circulate through the member 32 and some of this air enters the earth through the walls of the member.

Instead of having the water-feeding members extending up through the false floor they may be arranged at the outer edge of the floor, as shown in Figs. 8 to 12 inclusive.

In this form porous water-feed members 35 are shown which are especially formed to correspond with the curved walls 36 of a flower pot 37.

These water members 35 similarly to those already described rest at their lower ends on the bottom 38 of the pot 37 and lean outwardly against the curving wall 36 of the pot and rise pretty well toward the top of the ending, somewhat below the top of the earth.

As neither walls of the pot nor of the members 35 fit together accurately on account of their relatively rough manner of production, they provide more or less air spaces or passages 39 between the members 35 and the adjacent wall of the pot. However, it is sometimes best to provide shallow vertically-extending ribs 40 on the outer surfaces of the members 35 to assure the provision of this air passage. As in the form already described, a false floor or bottom 41 is provided at the point above the bottom of the pot and the members 35 are provided with the ledges 42 to support the floor 41. This floor is provided with drain holes 43 and the pot is provided with airholes 44 above the normal height of water in the bottom of the pot and below the floor 41. As in the other form these members 35 and 41 are made of porous material, such as unglazed baked clay, and preferably they are made in the manner described in reference to Figs. 5 and 6.

Preferably the circumferential spaces between the supports 35 are filled or stopped off by projecting parts 45 on the edge of the floor 41 to prevent the earth from falling through at these places. In Fig. 12 there is illustrated a form of water-feeding members and support 46 which is in the form of a pot lining circumferentially continuous instead of being made in a number of sections. This member can be provided with either the continuous ledge 47 or with projections for supporting the false floor 48. This floor is simpler to make than the floor 41, as it is circular in form and does not need edge projections. Also the member 46 does not need any external projections, such as the ribs 40, to assure air spaces between the support and the pot wall.

In Figs. 13 to 15 inclusive I have illustrated the adaption of the invention to a flower box as distinguished from a flower pot.

In this form the outer container 49 is in the form of an elongated open-topped box, having a bottom 50. Preferably a shallow drip pan or pot is provided which fits loosely within the box 49 and container 52 and is supported on top of the pan 51. The pot 52 has a bottom 53 and is adapted to contain water as shown at 54.

In this form the water-carrying members 55 are in the form of flat slabs with shallow vertical ribs 56 on their outer faces to provide air spaces between their backs and the inner surfaces of the walls of the box 52. Each of the members 55 is provided with a ledge 57 for supporting a false floor or bottom 58. The floor 58 is notched as shown at 59, Fig. 14 to receive the members 55 and to prevent the earth passing the floor. The floor may be made in suitable-sized sections as shown in Fig. 13. As in the former forms this floor is also provided with drip holes 60 and the supports 55 are provided with air circulation holes 61 to permit the air to circulate up behind these supports. To prevent the water in the bottom of the pot 52 rising to a height where it would escape through the air holes 62 an overflow pipe 63 is provided leading down into the pan 51 which in turn is provided with a drain pipe 64. The drain 64 may be provided with a valve 65 for drawing the overflow water off from time to time as may be necessary.

Similar to the form of pot shown in Fig. 8 this present form has air holes 62 which have the same function as the holes 44 in the form shown in Fig. 8.

As many modifications of the invention will readily suggest themselves to one skilled in the art I do not limit or confine the invention to the specific details of construction herein shown and described except within the scope of the appended claims.

I claim:

1. In a device of the kind described, an outer vessel for containing soil, a plurality of relatively wide and thick supports of porous material conformed to, disposed within and spaced about the wall of the vessel and extending from the bottom of the vessel nearly to the top thereof, the supports provided with ledges spaced from their lower ends for supporting a floor, and a perforated floor of like porous material on said ledges.

2. The invention as defined in claim 1, the supports provided with shallow ribs at their lateral edges for contact with the wall of the vessel and whereby the outer faces of the supports are spaced slightly from the wall of the vessel to provide free vertical air channels from the lower part of the vessel and terminating at their upper ends slightly below the normal height of the soil in the vessel.

3. The invention as defined in claim 1, the porous floor provided with notches to receive the supports and with alternately projecting portions to extend into contact with the wall of the vessel for retaining the supports in position and closing the spaces between them.

4. In a device of the kind described, a vessel, an inner porous wall conformed to and spaced slightly from the wall of the vessel, the porous wall extending up from the bottom of the vessel and terminating at its upper end but slightly below the normal height of the soil in the vessel, a porous, perforated false bottom above the bottom of the vessel and the inner porous wall provided with a supporting ledge for the false bottom as and for the purpose specified.

5. In a device of the kind described, a unitary vessel adapted to contain water in its lower end, a perforated porous bottom above the lower end of the vessel, porous bottom-supporting means conformed to the inner surface of the vessel and extending down into the lower end thereof, and the wall of the vessel formed with an overflow opening below the porous bottom as and for the purpose specified.

HARRY D. KNELLER.